Jan. 29, 1957 E. F. WIDEMAN 2,779,635
BLEEDING VALVE FOR AIR BRAKE CYLINDERS
Filed April 30, 1954 2 Sheets-Sheet 1
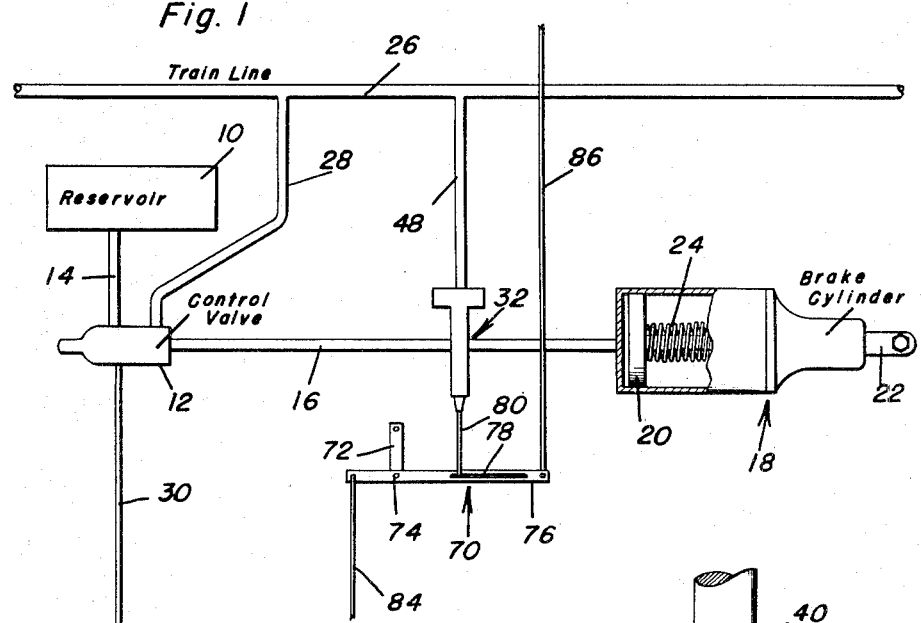
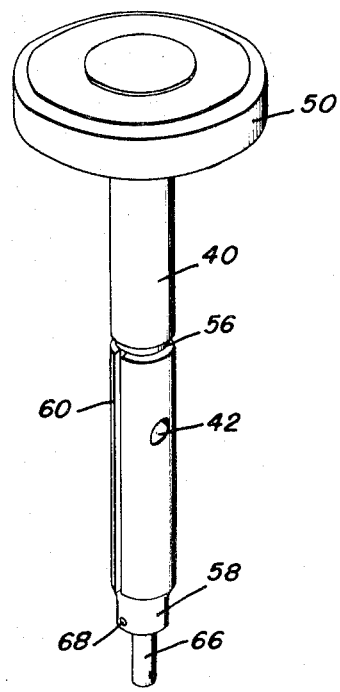
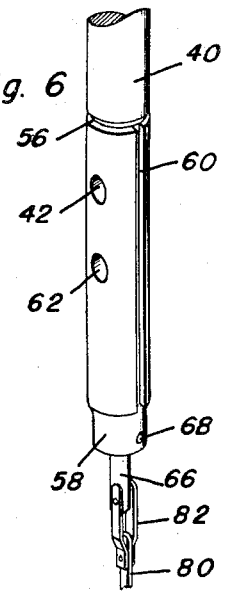
Ewell F. Wideman
INVENTOR.

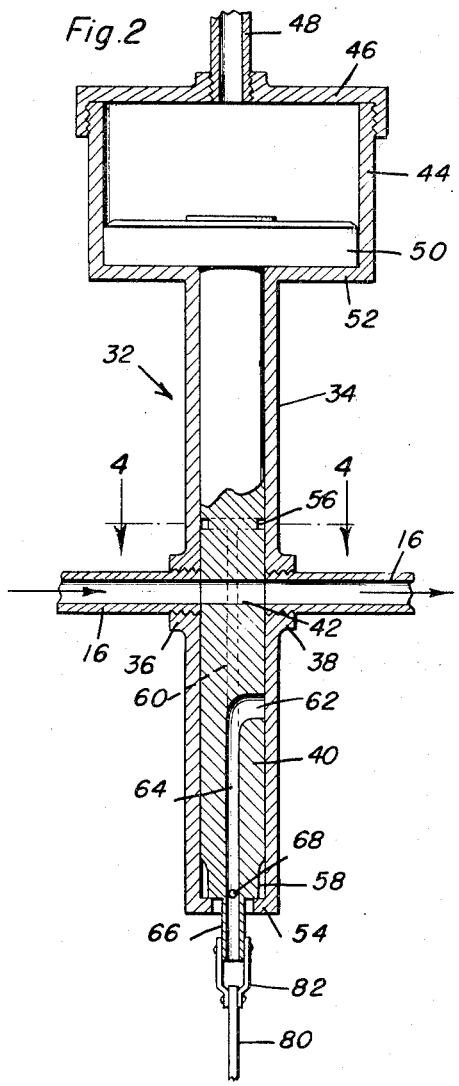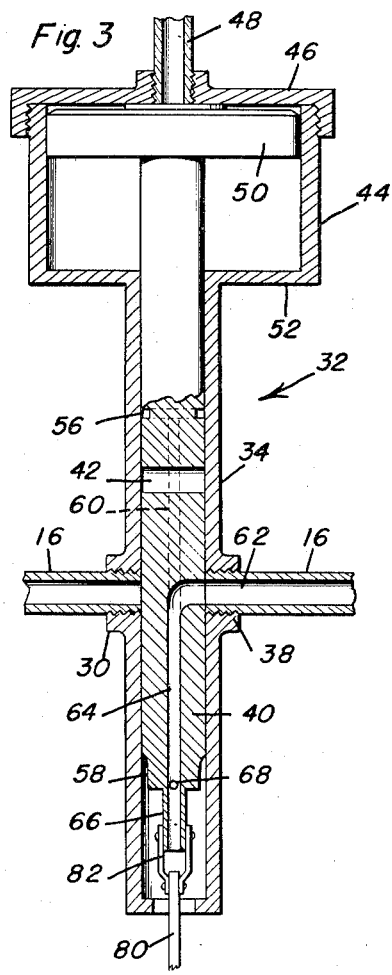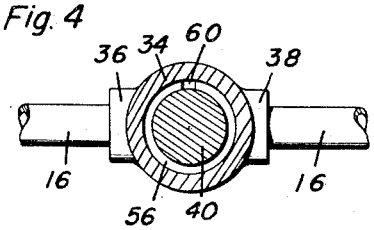

United States Patent Office 2,779,635
Patented Jan. 29, 1957

2,779,635

BLEEDING VALVES FOR AIR BRAKE CYLINDERS

Ewell F. Wideman, Wetumpka, Ala.

Application April 30, 1954, Serial No. 426,839

1 Claim. (Cl. 303—68)

This invention relates in general to improvements in accessories for railway air brakes, and more specifically to an air brake bleeding mechanism.

In the present air brake system utilized on railroad trains each car is provided with a reservoir which is communicated with a brake cylinder of the car through a car brake control valve. Also connected to the car brake control valve is a train air line. When the pressure in the train air line drops below a certain point, the car brake control valve communicates the reservoir of the car with the brake cylinder with the result that the brakes are set. When a car is detached from an engine all of the air in the train air line is released with the result that the reservoir is fully communicated with the brake cylinder so as to fully set the brakes. When it is desired to move such a car it is necessary to bleed all of the air from the brake cylinder with the result that the air in the reservoir is lost. Then, when an engine or other components of a train is coupled to a car it is first necessary to pump up the pressure in the reservoir of the car through the train air line before the car can become a part of the brake system of the train. It will be seen that this is a time consuming operation and causes many delays in the making up of long trains, such as freight trains.

It is therefore the primary object of this invention to provide a bleed valve mechanism for air brakes which is of such a nature whereby air may be bled from a brake cylinder of the car and at the same time a major portion of the reservoir of such car is saved so as to greatly eliminate the pumping up of pressure within the reservoir when the car is again coupled to a train.

Another object of this invention is to provide an air brake bleeding mechanism which controls the flow of air through a car air line to a car brake cylinder and which is effectively positionable to bleed air from the car brake cylinder, the mechanism being retained from a bleeding position by the pressure of the train air line of the car.

Another object of this invention is to provide an air brake bleeding mechanism for railway cars, the mechanism being substantially fool-proof inasmuch as it is normally retained in a brake actuating position by pressure within the train air line and which is movable to a brake bleeding position only when there is no pressure in the train air line and when it is so positioned manually.

A further object of this invention is to provide an air brake bleeding mechanism which includes a valve housing having a valve member slidably mounted therein, the valve member being associated with a piston and cylinder with the position of the piston being controlled by air, the valve member being provided with a vent so as to prevent the escape of air around the piston and into the car air line so as to accidentially set the brakes of the car.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view of an air brake system of a railway car and shows the arrangement of the air brake bleeding mechanism which is the subject of this invention has disposed therein, a portion of a brake cylinder being broken away and shown in section in order to clearly illustrate the details of the interior thereof;

Figure 2 is an enlarged sectional view taken through the air brake bleeding mechanism and shows the general details of construction thereof, a valve member thereof being in a position to permit the normal operation of the brake system of the railway car;

Figure 3 is an enlarged sectional view similar to Figure 2 and shows the valve member moved to a brake cylinder bleeding position;

Figure 4 is an enlarged transverse sectional view taken substantially upon the plane indicated by the section line 4—4 of Figure 2 and shows the details of a vent formed in the valve member for bleeding off air which may escape past the piston connected to the valve member for actuating the same;

Figure 5 is an enlarged rotated perspective view of the valve member and shows the general details thereof; and Figure 6 is an enlarged perspective view of the lower portion of the valve member and shows the arrangement of the supports therein.

Referring now to the drawings in detail, it will be seen that there is illustrated the brake arrangement for one end of a railway car. The brake arrangement includes a reservoir 10 which is normally charged with compressed air. Connecting the reservoir 10 to a car brake control valve 12, which is conventional, is a pipe 14. A pipe 16 connects the car brake control valve to a conventional brake cylinder which is referred to in general by the reference numeral 18. The brake cylinder 18 is provided with a piston 20 which is normally urged to a brake setting position by compressed air from the pipe 16. The piston 20 has connected thereto a piston rod 22 which is suitably connected to a brake beam (not shown) of the railway car. The piston 20 is urged towards a brake releasing position by a spring 24 carried by the piston rod 22 within the confines of the brake cylinder 18. A railway car also includes a train air line 26. The train air line 26 is connected to the car brake control valve 12 by a pipe 28.

In the normal operation of the brake system of the railway car the train air line 26 is filled with compressed air which is normally at the same pressure as the compressed air in the reservoir 10. When the brakes of a train are applied, the air pressure within the train air line 26 is reduced at which time the control valve 12 is actuated to communicate the reservoir 10 with the brake cylinder 18 so as to cause actuation of the brake cylinder 18. When the brakes on the train are released, the air pressure within the train air line 26 is restored and the car brake control valve 12 permits the resupplying of the air which has been lost from the reservoir. When the railway car is cut off from the rest of the train, the air pressure in the train air line 26 becomes that of the atmosphere and the reservoir 10 is directly communicated with the brake cylinder 18. When it is desired to release the brakes of the railway car, it is necessary to manually actuate a conventional auxiliary reservoir release valve (not shown) by a control lever 30. In so doing, the air from within the brake cylinder is bled off and at the same time most of the air from the reservoir 10 is lost inasmuch as there is no air pressure within the pipe 28 for actuating the car brake control valve.

When it is desired to connect the railway car to another train, it is first necessary to pump the reservoir 10 full of air through the train air line 26. It will be seen that this is time consuming and a wasteful operation. In order to prevent this there is provided the air brake bleeding mechanism which is the subject of this invention, the air brake bleeding mechanism being referred to in general by the reference numeral 32.

The air brake bleeding mechanism 32 includes a valve housing 34 which, as is best illustrated in Figures 2 and 3, is provided intermediate its ends with diametrically opposite fittings 36 and 38. The fitting 36 has connected thereto the end of the pipe 16 which is connected to the car brake control valve 12 and the fitting 38 has connected thereto the end of the pipe 16 which is connected to the brake cylinder 18.

In order that flow of air to and from the brake cylinder 18 may be selectively controlled, there is slidably disposed within the valve housing 34 a valve member 40. The valve member 40 is provided intermediate its ends with a first port 42 which extends diametrically therethrough. The port 42 is alignable with the two fittings 36 and 38 to permit the uninterrupted flow of air through the pipe 16.

It will be noted that one end of the valve housing 34 has carried thereby a cylinder 44. The cylinder 44 is provided with a cylinder head 46 which has connected thereto a pipe 48 whose opposite end is connected directly to the train air line 26. Disposed within the cylinder 44 is a piston 50 which is secured to one end of the valve member 40.

In order that the first port 42 may be aligned with the fittings 36 and 38, the valve member 40 is so proportioned that when the port 42 is aligned with the fittings 36 and 38, the piston 50 is in engagement with a wall 52 of the cylinder 44 opposite the cylinder head 46. Also, the valve housing 34 is provided at the end remote from the cylinder 44 with an inwardly directed annular flange 54 which is engageable with the end of the valve member 40 remote from the piston 50 to provide a stop. It will be seen that the air pressure within the cylinder 44 as a result of the air pressure within the train air line 26 will normally retain the valve member 40 in such a position whereby the portions of the pipe 16 are communicated through the first port 42.

In order that any air which may leak past the piston 50 will not accidentally enter into the pipe 16 to set the brake of the railway car through the actuation of the brake cylinder 18, the valve member 40 is provided with a vent which includes an annular recess 56 in the exterior of the valve member 40 between the piston 50 and the first port 42. The annular recess 56 is communicated with a reduced lower end portion 58 of the valve member 40 by a longitudinally extending recess 60 so that the escaping air may be vented off through the end of the valve housing 34 remote from the cylinder 44.

In order that air may be bled from the brake cylinder 18 without bleeding the air from the reservoir 10, the valve member 40 is provided with a second port 62 which is communicated with an air passage 64 which extends longitudinally of the valve member 40 along the center line thereof. The air passage 64 continues through the extreme end of the valve member 40 remote from the piston 50 which is in the form of a tube 66. The tube 66 has the free end thereof open in order that air may escape through the air passage 64 after it has entered the second port 62.

The proportions of the valve member 40 are such that when the piston 50 is in engagement with the cylinder head 46, the second port 62 is aligned with the fitting 38 so as to permit the flow of air from the brake cylinder 18 into the pipe 16, into the second port 62 and out through the air passage 64.

Inasmuch as the reduced end portion 58 of the valve member 40 is engaged with the annular flange 54 when the cylinder 44 is filled with air, in order that air be properly vented in the event it escapes past the piston 50, the longitudinal recess 60 is communicated with the air passage 64 by a bore 68. The position of this bore is best illustrated in Figures 5 and 6.

In order that the valve member 40 may be selectively moved to a brake cylinder venting position, the valve member 40 is provided with a manually operable actuating mechanism which is referred to in general by the reference numeral 70. The operating mechanism 70 includes a mounting bracket 72 intended to be secured to the railway car. Pivotally mounted on the mounting bracket 70 by pivot pin 74 is a lever 76. The lever 76 is formed with an elongated slot 78 in which is connected one end of a rod 80 whose opposite end is connected by a fork 82 to the tube 66, as is best illustrated in Figure 2.

One end of the lever 76 has connected thereto a pull rod 84 which extends to one side of the railway car. The opposite end of the lever 76 has connected thereto a pull rod 86 which extends to the opposite side of the railway car so that the valve member 40 may be selectively positioned by a trainman from either side of the railway car.

In the operation of the air brake system of the railway car provided with the air brake bleeding mechanism 32, the brakes are actuated in the normal manner. However, when the car has been cut off from the remainder of a train and the air pressure within the train air line 26 has been reduced to that of the atmosphere, the brake cylinder 18 may be bled with a minimum of loss of air pressure within the reservoir 10. To accomplish this, the valve member 40 is moved to the bleeding position illustrated in Figure 3. It will be seen that air will then be bled only from the brake cylinder 18.

When the railway car is again connected to a train, air pressure is built up in the train air line 26 which results in the shifting of the valve member 40 to the position illustrated in Figure 2. This communicates the reservoir 10 with the brake cylinder and again sets the brakes, inasmuch as the air pressure within the train line 26 will not be sufficient to override the car brake control valve 12. However, a considerable amount of air pressure will remain within the reservoir 10 so that only that air lost in twice actuating the brake cylinder 18 need be resupplied to the reservoir 10. It will thus be seen that the time required to build up the pressure in the air brake system of a railway car which is equipped with the air brake bleeding mechanism which is the subject of this invention will be greatly reduced. This will greatly decrease the time now lost in making up trains. Also, in the case of the brakeage of an air line in freight trains, which is more or less a normal occurrence only a minimum time will be required to again build up the air pressure in the entire train after each of the brake cylinders has been bled.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A bleeding valve for air brake cylinders, said valve comprising a substantially tubular housing provided at one end thereof with an opening communicating with the atmosphere, an enlarged air cylinder provided at the other end of said housing, said cylinder having an inner end wall adjacent the housing and an outer end wall provided with a conduit adapted to be connected to a brake pipe for delivering air under pressure to said air cylinder, a piston slidable in said cylinder and engageable with the inner and outer end walls thereof, a rod-shaped valve member secured to said piston and slidable in said housing.

a brake cylinder control valve connecting port and a brake cylinder connecting port provided in diametrically opposed relation on an intermediate portion of said housing, an intermediate portion of said valve member being provided with a transverse passage which is in register with said brake cylinder control valve connecting port and said brake cylinder connecting port and establishes communication therebetween when said piston engages the inner end wall of said air cylinder when fluid under pressure is delivered thereto, said valve member also being provided with an axial bore disconnected from said passage, said bore communicating at one end thereof with said opening of said housing and having a lateral extension at its other end registrable with said brake cylinder connecting port when said piston engages the outer end wall of said air cylinder whereby said brake cylinder connecting port is vented to the atmosphere, the outer surface of said valve member being provided at a point between said passage and said piston with a circumferential groove and with an open-ended channel extending longitudinally from said groove to the end of the valve member adjacent said opening of said housing whereby to prevent leakage of air from said air cylinder to said passage, and an externally manipulable actuating rod extending freely through said opening and operatively connected to said valve member for sliding the same to a brake cylinder bleeding position wherein said piston engages the outer end wall of said air cylinder.

References Cited in the file of this patent
UNITED STATES PATENTS

| | | |
|---|---|---|
| 1,276,049 | Finley | Aug. 20, 1918 |
| 2,287,775 | Baker et al. | June 30, 1942 |
| 2,616,767 | James | Nov. 4, 1952 |